(12) United States Patent
Baba et al.

(10) Patent No.: US 11,394,456 B2
(45) Date of Patent: Jul. 19, 2022

(54) ARRANGEMENT DETERMINATION APPARATUS, NON-TRANSITORY COMPUTER-READABLE STORAGE MEDIUM HAVING STORED THEREON PROGRAM, AND ARRANGEMENT DETERMINATION METHOD

(71) Applicant: HAPSMobile Inc., Tokyo (JP)

(72) Inventors: Akihiro Baba, Tokyo (JP); Yuki Ota, Tokyo (JP)

(73) Assignee: HAPSMobile Inc., Tokyo (JP)

( * ) Notice: Subject to any disclaimer, the term of this patent is extended or adjusted under 35 U.S.C. 154(b) by 0 days.

(21) Appl. No.: 17/644,332

(22) Filed: Dec. 14, 2021

(65) Prior Publication Data

US 2022/0092867 A1 Mar. 24, 2022

Related U.S. Application Data

(63) Continuation of application No. PCT/JP2020/003294, filed on Jan. 30, 2020.

(30) Foreign Application Priority Data

Jun. 18, 2019 (JP) .............................. JP2019-113179

(51) Int. Cl.
*H04B 7/185* (2006.01)
*B64C 39/02* (2006.01)
*H04W 84/06* (2009.01)

(52) U.S. Cl.
CPC ......... *H04B 7/18504* (2013.01); *B64C 39/02* (2013.01); *H04W 84/06* (2013.01); *B64C 2201/122* (2013.01)

(58) Field of Classification Search
CPC .............. H04B 7/18504; B64C 39/02; B64C 2201/122; H04W 84/06
See application file for complete search history.

(56) References Cited

U.S. PATENT DOCUMENTS

2016/0035224 A1\* 2/2016 Yang .................... G08G 5/0078
701/23

FOREIGN PATENT DOCUMENTS

| JP | 2002211496 A | | 7/2002 |
| JP | 2005197871 A | \* | 7/2005 |

(Continued)

OTHER PUBLICATIONS

International Search Report and (ISA/237) Written Opinion of the International Search Authority for International Patent Application No. PCT/JP2020/003294, mailed by the Japan Patent Office dated Mar. 10, 2020.

*Primary Examiner* — Ankur Jain

(57) ABSTRACT

An arrangement determination apparatus is provided comprising a target region identifying unit configured to identify a target region for providing service by a plurality of flying objects, the plurality of flying objects forming a wireless communication area on a ground by emitting a beam toward the ground, a flying object number retrieving unit configured to retrieve a number of the plurality of flying objects, a point retrieving unit configured to retrieve a point for each of a plurality of meshes obtained by dividing the target region, and an arrangement determination unit configured to determine an arrangement of the plurality of flying objects over the target region based on the number of flying objects and the point for each of the plurality of meshes.

20 Claims, 7 Drawing Sheets

(56) References Cited

FOREIGN PATENT DOCUMENTS

| JP | 2006101294 A | * | 4/2006 | |
|----|--------------|---|--------|--|
| JP | 2010187140 A | * | 8/2010 | |
| JP | 2017504863 A | * | 2/2017 | ........... G08G 5/0043 |
| JP | 2017504863 A |   | 2/2017 | |
| JP | 2018177135 A | * | 11/2018 | ............... B64B 1/40 |
| JP | 2018177135 A |   | 11/2018 | |
| JP | 2019086902 A | * | 6/2019 | |
| JP | 2019086902 A |   | 6/2019 | |

* cited by examiner

710

| EACH CONDITION | SERVICE | | AREA | | CONDITION |
|---|---|---|---|---|---|
| | PHONE CALL | × | ROAD | × | LATITUDE |
| | | | POPULATION | | COMMUNCIATION CAPACITY |
| | ROAMING | | FARM/PASTURE | | NO-FLY AREA |
| | | | MNO COVERAGE | | GATEWAY INSTALLATION LOCATION |
| | IoT | | NO SERVICE | | |

FIG.5

| RANK | MeshID | Point | NUMBER OF CARS (PER MONTH) | POPULATION (PER MONTH) | FARM/ PASTURE (PER MONTH) | MNO COVE- RAGE | NO SERVICE NUMBER OF COMMUNI- CATION LOG NG) | LATITUDE | CAPACITY (GB PER MONTH) | NO-FLY AREA | GW INSTALLATION |
|---|---|---|---|---|---|---|---|---|---|---|---|
| 1 | 1000001 | 120 | 200 | 1000 | 0 | 1 | 20 | 35 | 750 | 0 | 1 |
| 2 | 1000002 | 100 | 160 | 1200 | 0 | 1 | 24 | 35 | 750 | 0 | 1 |
| 3 | 1000003 | 90 | 100 | 800 | 0 | 1 | 10 | 35 | 750 | 0 | 0 |
| 4 | 1000004 | 95 | 111 | 980 | 10 | 1 | 3 | 36 | 750 | 0 | 1 |
| 5 | 1000005 | 80 | 80 | 50 | 0 | 1 | 2 | 36 | 750 | 0 | 0 |
| 6 | 1000006 | 60 | 50 | 300 | 0 | 1 | 9 | 37 | 750 | 0 | 0 |
| 7 | 1000007 | 0 | 0 | 20 | 14 | 0 | 1 | 36 | 750 | 0 | 0 |
| 7 | 1000008 | 0 | 0 | 2 | 0 | 0 | 2 | 37 | 750 | 1 | 0 |
| 7 | 1000009 | 0 | 0 | 22 | 19 | 0 | 4 | 37 | 750 | 0 | 0 |

ARRANGEMENT DETERMINATION APPARATUS, NON-TRANSITORY COMPUTER-READABLE STORAGE MEDIUM HAVING STORED THEREON PROGRAM, AND ARRANGEMENT DETERMINATION METHOD

The contents of the following Japanese and PCT patent applications are incorporated herein by reference:
NO. 2019-113179 filed in JP on Jun. 18, 2019
NO. PCT/JP2020/003294 filed in WO on Jan. 30, 2020

BACKGROUND

1. Technical Field

The present invention relates to an arrangement determination apparatus, a non-transitory computer-readable storage medium having stored thereon a program, and an arrangement determination method.

2. Related Art

A flying object having an antenna which flies through the stratosphere in order to provide a stratospheric platform has been known (see Patent document 1, for example).

RELATED ART LITERATURE

Patent Document

[Patent Document 1] Japanese Patent Application Publication No. 2002-211496

PROBLEM TO BE SOLVED

It is desirable to provide a technology to assist in appropriate arrangement of a plurality of flying objects.

BRIEF DESCRIPTION OF THE DRAWINGS

FIG. 5 illustrates one example of a condition list 710.

FIG. 6 schematically illustrates one example of a data list 720.

DESCRIPTION OF EXEMPLARY EMBODIMENTS

Hereinafter, the present invention will be described through embodiments of the invention, but the following embodiments do not limit the invention according to the claims. In addition, not all combinations of the features described in the embodiments necessarily have to be essential to solving means of the invention.

Figure 1:
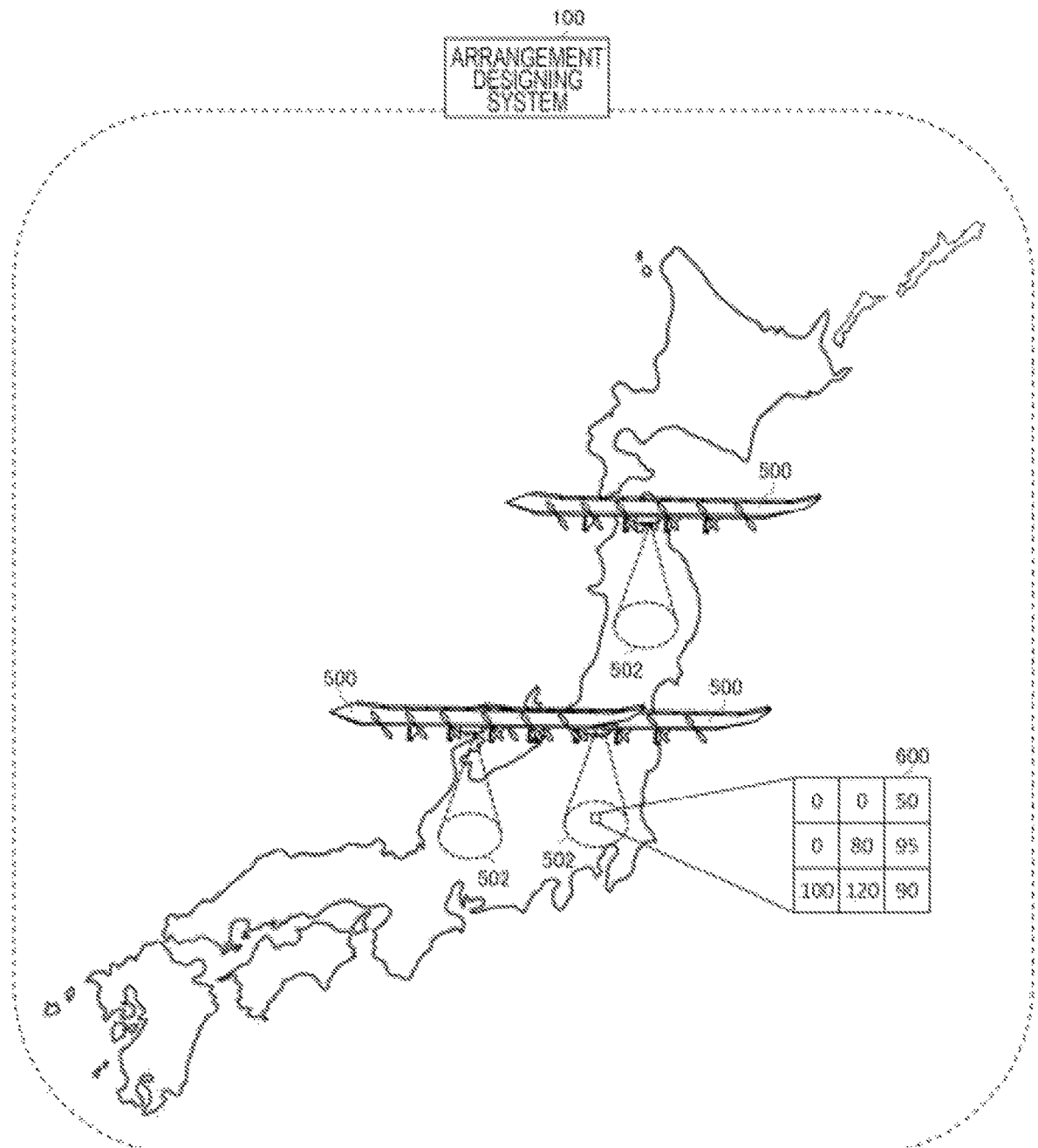
FIG. 1 schematically illustrates one example of an arrangement determined by the arrangement designing system 100.

FIG. 1 schematically illustrates one example of an arrangement determined by the arrangement designing system 100. The arrangement designing system 100 according to the present embodiment determines an arrangement of a plurality of flying objects 500 forming a wireless communication area 502 on the ground by emitting a beam toward the ground. The flying object 500 functions as a stratospheric platform, for example.

For example, in a case where a plurality of flying objects 500 are to be arranged at various locations in Japan, it is possible to cover the entire region in Japan if a sufficient number of flying objects can be secured. However, for a variety of reasons, there are cases where it is not possible to secure a sufficient number of flying objects. In such a situation, it is desirable to be able to determine and arrangement of a plurality of flying objects 500 such that a limited number of flying objects are optimally arranged based on a business plan or the like.

The arrangement designing system 100 according to the present embodiment identifies the target region for providing service by the plurality of flying objects 500, and determines an arrangement of the plurality of flying objects 500 over the target region based on the number of flying objects 500 and a point for each of the plurality of of meshes 600 obtained by dividing the target region. The size of the mesh 600 may be of any size, such as 1 km² for example.

The arrangement designing system 100 calculates, in a case where a plurality of flying objects 500 are arranged, for example, a total point obtained by adding the points of the meshes 600 included in a area which will be covered by the wireless communication area 502 of each of the plurality of flying objects 500. The arrangement designing system 100 calculates a total points for each of the arrangement of a plurality of patterns, and determines, as an arrangement of the plurality of flying objects 500, the arrangement having the highest total point, for example.

The arrangement designing system 100 presents, for example, the determined arrangement to a service provider who is to provide service by the plurality of flying objects 500. The service provider may check the presented arrangement and consider the arrangement. In addition, the arrangement designing system 100 may move the plurality of flying objects 500 into the determined arrangement.

Figure 2:
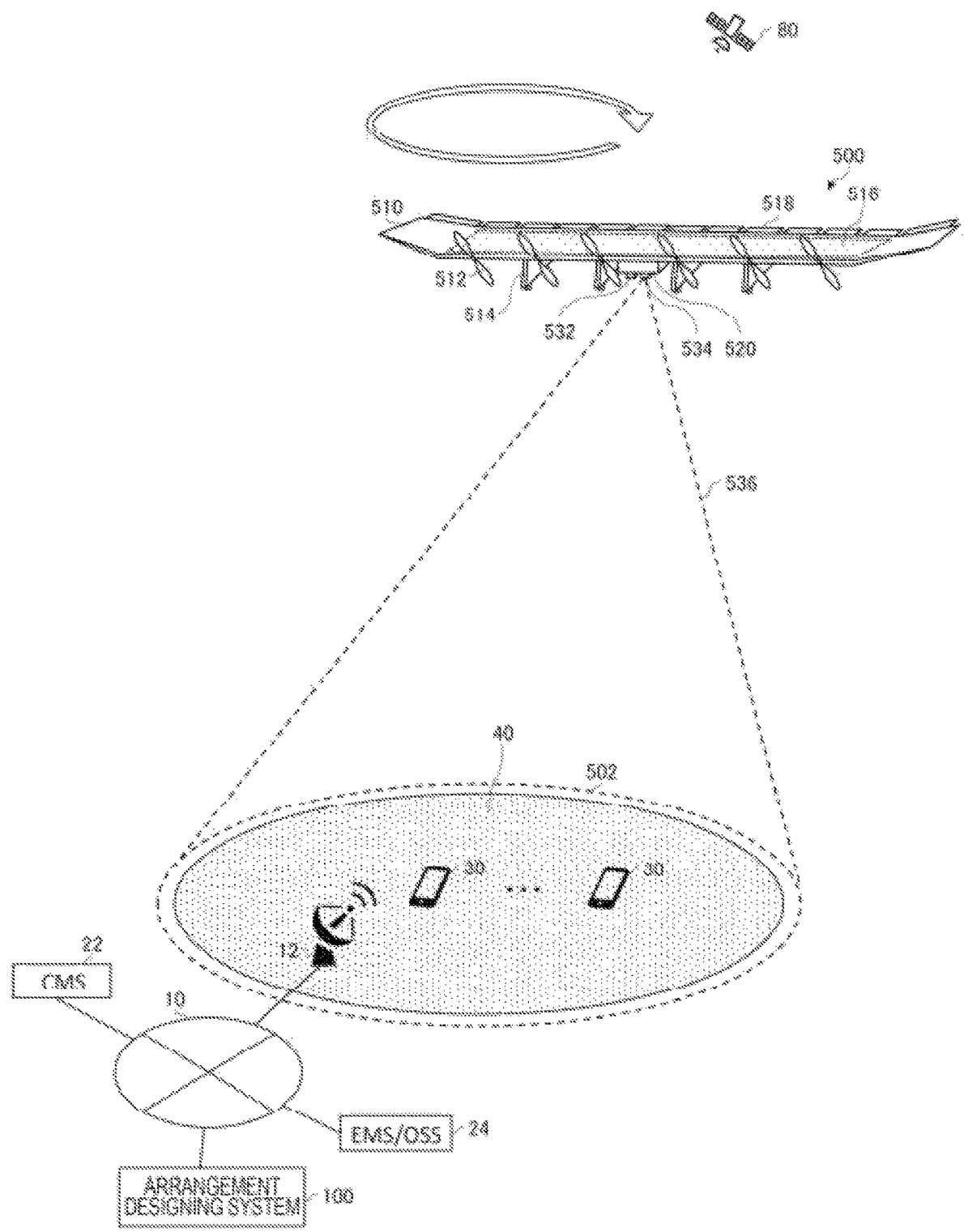
FIG. 2 schematically illustrates one example of a flying object 500.

FIG. 2 schematically illustrates one example of the flying object 500. The flying object 500 includes a main wing portion 510, a propeller 512, a skid 514, a solar panel 516, a flap 518, a body portion 520, an antenna 532, and an antenna 534.

The electrical power generated by the solar panel 516 is stored in a battery arranged on at least any of the main wing portion 510 and the body portion 520. The electrical power of the battery is supplied to the propeller 512, the flap 518, the body portion 520, the antenna 532, and the antenna 534.

The body portion 520 includes a flight control apparatus and a wireless communication apparatus. The flight control apparatus controls flight of the flying object 500. The flight control apparatus controls flight of the flying object 500 by rotating the propeller 512 or changing the angle of the flap 518, for example.

The wireless communication apparatus performs wireless communication using the antenna 532 and the antenna 534. The antenna 532 may be an antenna for a feeder link. The antenna 534 may be an antenna for a service link.

The wireless communication apparatus establishes a feeder link with a gateway 12 by emitting a beam toward the gateway 12 on the ground by using the antenna 532. In addition, the wireless communication apparatus forms a wireless communication area 502 on the ground by emitting a beam 536 toward the ground by using the antenna 534 to provide the user terminal 30 within the wireless communication area 502 with wireless communication service.

The user terminal 30 may be any terminal as long as it is a communication terminal that is capable of communication with the flying object 500. For example, the user terminal 30 is mobile phone such as a smart phone. The user terminal 30 may also be a tablet terminal, a PC (Personal Computer) and the like. The user terminal 30 may also be a communication terminal equipped on a vehicle such as an automobile or an unmanned aircraft such as a drone. In addition, the user terminal 30 may be a so-called IoT (Internet of Thing) device. The user terminal 30 may include all things corresponding to so-called IoE (Internet of Everything).

The flying object 500 relays communication between, for example, the user terminal 30 and a network 10 on the ground to provide the user terminal 30 with wireless communication service. The network 10 may include a core network provided by a telecommunication carrier. The core network may comply with any mobile communication system, and for example, complies with a 3G (3rd Generation) communication system, an LTE (Long Term Evolution) communication system, a 4G (4th Generation) communication system, and a 5G (5th Generation) communication system and subsequent mobile communication systems, and the like. The network 10 may include the Internet.

For example, the flying object 500 establishes a service link with the gateway 12 that is capable of communication by the antenna 532, among the gateways 12 arranged at each location on the ground, and communicates with the network 10 on the ground via the gateway 12. In addition, the flying object 500 communicates with the network 10 via a communication satellite 80, for example. In this case, the flying object 500 includes an antenna for communicating with the communication satellite 80.

The flying object 500 transmits the data received from the user terminal 30 within the wireless communication area 502, for example, to the network 10. In addition, in a case where the flying object 500 received data addressed to the user terminal 30 within the wireless communication area 502 via the network 10, for example, it transmits said data to the user terminal 30.

The flying object 500 covers the target area 40 by the wireless communication area 502 while flying along a circular flight path in a turning manner in the air over the target area 40 above the ground set as the target to be covered by the wireless communication area 502, for example. The flight path may be a precise circle, an oval, and the like, as well as in the figure of eight or the like. The flying object 500 flying in the air over a ground area in a turning manner may be described as fixed point flight.

The arrangement designing system 100 may communicate with the flight control apparatus of the flying object 500 via a CMS (Constellation Management System) 22 which manages flight of the plurality of flying objects 500. The CMS 22 and the flying object 500 may communicate via the network 10 and the communication satellite 80. Note that, the CMS 22 and the flying object 500 may communicate via the network 10 and the gateway 12.

The arrangement designing system 100 may communicate with the wireless communication apparatus of the flying object 500 via an EMS (Element Management System)/OSS (Operation Support System) 24 which manages wireless communication by the wireless communication apparatuses of the plurality of flying objects 500. The EMS/OSS 24 and the flying object 500 may communicate via the network 10 and the gateway 12. Note that, the EMS/OSS 24 and the flying object 500 may communicate via the network 10 and the communication satellite 80.

Figure 3:
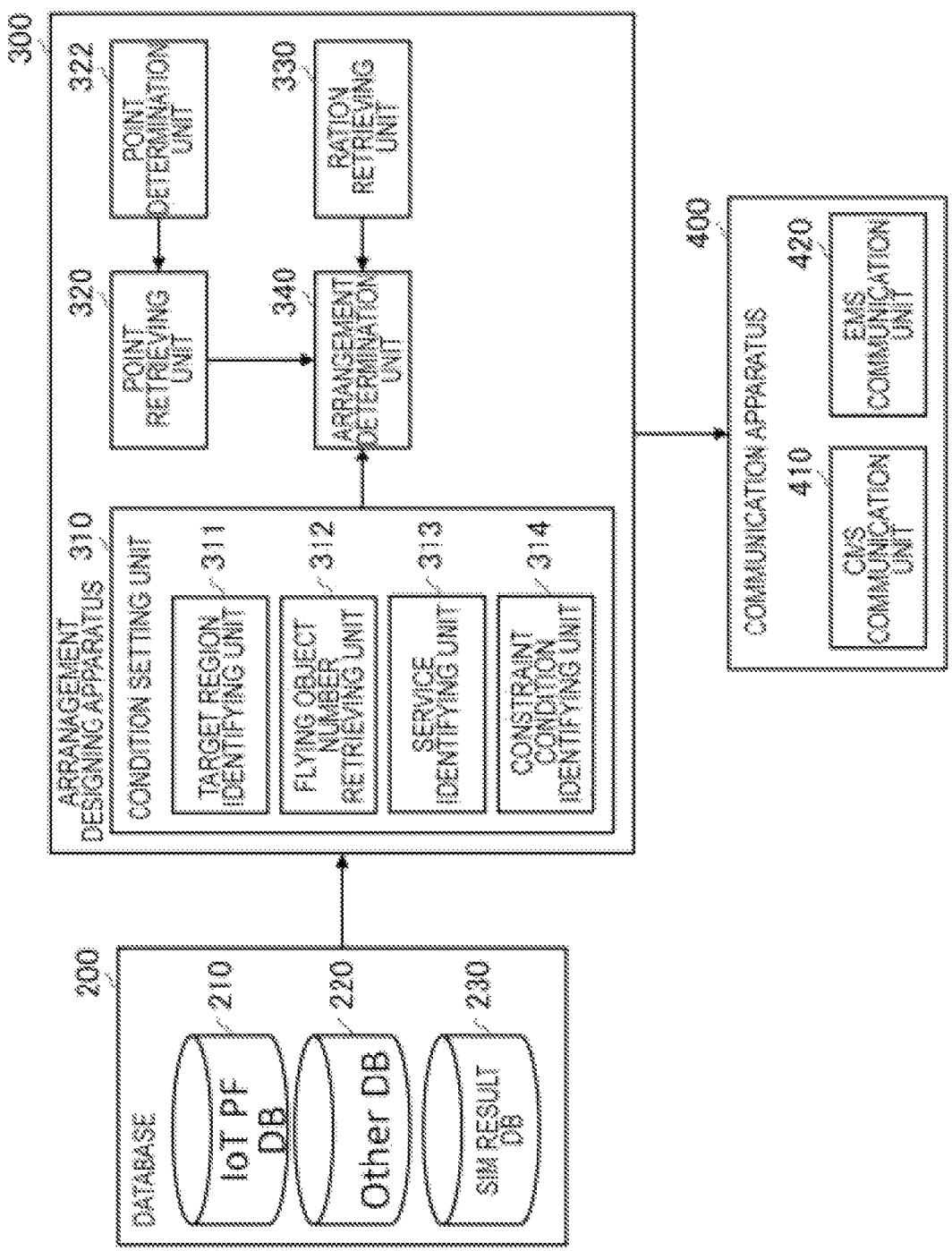
FIG. 3 schematically illustrates one example of a functional configuration of the arrangement designing system 100.

FIG. 3 schematically illustrates one example of a functional configuration of the arrangement designing system 100. The arrangement designing system 100 includes a database 200, an arrangement determination apparatus 300, and a communication apparatus 400.

The database 200 stores various types of data. The database 200 includes an IoTPFDB (IoT PlatForm Database) 210, OtherDB 220, and a SIM result DB 230.

The IoTPFDB 210 stores information on vehicles, drones, IoT devices and the like at each location. It is desirable that the IoTPFDB 210 stores information in real-time as much as possible.

The IoTPFDB 210 receives, for example, information on the vehicles from a vehicle management system that manages the state of vehicles at each location, as required. The IoTPFDB 210 stores the number of vehicles for each of the meshes 600, for example, based on the received information on the vehicles. The IoTPFDB 210 may store an average number of vehicles for each of the meshes for each predetermined period, such as each month.

The IoTPFDB 210 receives information on drones, for example, from a drone management system that manages the state of drones at each location, as required. The IoTPFDB 210 stores the number of drones for each of the meshes 600, for example, based on the received information on the drones. The IoTPFDB 210 may store an average number of drones for each of the meshes for each predetermined period, such as each month.

The IoTPFDB 210 receives information on IoT devices, for example, from an IoT device management system that manages the state of IoT devices at each location, as required. The IoTPFDB 210 stores the number of IoT devices for each of the meshes 600, for example, based on the received information on the IoT devices. The IoTPFDB 210 may store an average number of IoT devices for each of the meshes for each predetermined period, such as each month.

The OtherDB 220 stores population at each location, coverage state over the ground by a radio base station on the ground, communication state by the user terminal 30 and the like. The communication state by the user terminal 30 at each location includes, for example, an average amount of communication or the like at each location for each predetermined period, such as each month. The OtherDB 220 may store the population for each of the meshes 600. The OtherDB 220 may store the coverage state for each of the meshes 600. The OtherDB 220 may store the average amount of communication by the user terminal 30 for each of the meshes 600.

The SIM result DB 230 stores a simulation result. The SIM result DB 230 stores a result of simulating the ratio of an area covered by the beam 536 among the area of the mesh 600, for each of the meshes 600 included in the wireless communication area 502 in a case where the flying object 500 is arranged at a location, based on topography data, for example. For example, in a case where there is a mountain in the mesh 600, a portion which is included in the shadow of a mountain will not be covered by the beam 536, resulting in a lower ratio. Such a simulation is performed, for example, by a telecommunication carrier or the like. The SIM result DB 230 retrieves and stores the result of simulation performed by the telecommunication carrier or the like, for example.

The arrangement determination apparatus 300 includes a condition setting unit 310, a point retrieving unit 320, a point determining unit 322, a ratio retrieving unit 330, and an arrangement determination unit 340. The arrangement determination apparatus 300 does not necessarily include all of these.

The condition setting unit 310 sets various types of conditions. The condition setting unit 310 includes a target region identifying unit 311, a flying object number retrieving unit 312, a service identifying unit 313, and a constraint condition identifying unit 314.

The target region identifying unit 311 identifies a target region for providing service by the plurality of flying objects 500. The target region identifying unit 311 identifies the target region according to designation by the service provider, for example. The service provider designates the entire region in Japan in a case where the target for providing service by the plurality of flying objects 500 is Japan, and designates, for example, Kanto region in a case where the target is Kanto region. The target region is not limited to a country, a region or the like, and may be any zone.

The flying object number retrieving unit 312 retrieves the number of the plurality of flying objects 500 used for providing the service. The flying object number retrieving unit 312 retrieves the number of flying objects according to the designation by the service provider, for example. The service provider designates the number of flying objects 500 to be used for the service, among the flying objects 500 it possesses, for example.

The service identifying unit 313 identifies the service provided by the plurality of flying objects 500. The service identifying unit 313 identifies the service type, for example. In addition, the service identifying unit 313 identifies the condition in the area of service, for example. The service identifying unit 313 may identify the service according to the designation by the service provider. In a case where IoT service for connected cars is targeted, for example, the service provider designates service by an IoT device as the service type, and designates a road as the area.

The constraint condition identifying unit 314 identifies a constraint condition associated with the service. Examples of a constraint condition include whether a no-fly area is considered, whether the location of the gateway 12 is considered, whether the latitude is considered, whether communication capacity is considered, or the like.

In a case where a no-fly area is identified as the constraint condition, the no-fly area will be excluded from the arrangement of the flying objects 500. In a case where the location of the gateway 12 is identified as the constraint condition, the area in which no gateway 12 exists within a communication range will be excluded from the arrangement of the flying objects 500. In a case where latitude is identified as the constraint condition, an area in which the amount of electric power generated by the solar panel 516 of the flying object 500 is insufficient for providing service will be excluded from the arrangement of the flying objects 500.

In a case where communication capacity is identified as the constraint condition, the communication capacity providable by the flying object 500 and the communication capacity required at each location will be considered. For example, when the total value obtained by adding the communication capacity required for each of the meshes 600 in the wireless communication area 502 in a case where the flying object 500 is arranged at a location exceeds the communication capacity providable by the flying object 500, the arrangement will be excluded, or an arrangement will be considered such that said region is covered by a plurality of flying objects 500.

The point retrieving unit 320 retrieves the points of the plurality of meshes 600 within the target region identified by the target region identifying unit 311. The point retrieving unit 320 stores in advance point data in which the point of each of the plurality of meshes 600 determined based on various types of data in the database 200 is registered, for example, and retrieves the point of the mesh 600 corresponding to the target region from the point data. The point of each of the plurality of meshes 600 may be determined, for example, by an administrator of the arrangement designing system 100, a service provider, or the like.

The point determining unit 322 determines a point for each of the plurality of meshes 600. The point determining unit 322 may determine the point for each of the plurality of meshes 600 by service types. In a case where the service type is a service for providing an automobile with wireless communication, for example, the point determining unit 322 determines the point for each of the plurality of meshes 600 based on at least any of a number of roads, traffic amount on a road, a number of IoT devices which communicate with an automobile, and an average amount of communication by an automobile in each of the plurality of the meshes. The point determined by the point determining unit 322 may be registered in the point data stored by the point retrieving unit 320. The point retrieving unit 320 may retrieve the point for each of the plurality of meshes 600 corresponding to the service type identified by the service identifying unit 313.

The ratio retrieving unit 330 retrieves the ratio of the area covered by the beam 536, among the area of the mesh 600 for each of the plurality of meshes 600. The ratio retrieving unit 330 may retrieve said ratio from the SIM result DB 230.

The arrangement determination unit 340 determines the arrangement of the plurality of flying objects 500. The arrangement determination unit 340 may determine the arrangement of the plurality of flying objects 500 over the target region identified by the target region identifying unit 311 based on the number of flying objects retrieved by the flying object number retrieving unit 312 and the points retrieved by the point retrieving unit 320.

The arrangement determination unit 340 may determine the arrangement of the plurality of flying objects 500 such that the total amount of points for the plurality of meshes 600 included in the wireless communication area 502 formed by each of the plurality of flying objects 500 becomes higher. The arrangement determination unit 340 determines the arrangement of the plurality of flying objects 500 such that the total amount of the points for the plurality of meshes 600 included in the wireless communication area 502 formed by each of the plurality of flying objects 500 become the highest, by using genetic algorithm, for example.

The arrangement determination unit 340 may determine the arrangement of the plurality of flying objects 500 based on the ratio retrieved by the ratio retrieving unit 330. The arrangement determination unit 340 determines the arrangement of the plurality of flying objects 500 such that, for example, the total amount obtained by adding the results of multiplying a point for each of the plurality of meshes 600 included in the wireless communication area 502 formed by each of the plurality of flying objects 500 by the ratio for each of the plurality of meshes 600 becomes higher.

The arrangement determination unit 340 may calculate the total point in a case where the output intensity of the beam 536 of the plurality of flying objects 500 is changed variously. The arrangement determination unit 340 may then determine the arrangement of the plurality of flying objects 500 and the output intensity of a beam 536 of each of the plurality of flying objects 500.

The arrangement determination unit 340 may determine the arrangement of the plurality of flying objects 500 further based on the constraint condition identified by the constraint condition identifying unit 314. The arrangement determination unit 340 determines the arrangement of the plurality of flying objects 500 further based on the latitude of the plurality of meshes 600, for example. As a specific example, the arrangement determination unit 340 excludes, from the arrangement of the flying objects 500, an area in which the amount of electric power generated by the solar panel 516 of the flying object 500 is insufficient for providing service.

In addition, the arrangement determination unit 340 determines the arrangement of the plurality of flying objects 500 further based on a no-fly area, for example. As a specific example, the arrangement determination unit 340 determines the arrangement of the plurality of flying objects 500 excluding the no-fly area.

In addition, the arrangement determination unit 340 determines the arrangement of the plurality of flying objects 500 further based on the location of the gateway 12, for example. As a specific example, the arrangement determination unit 340 determines the arrangement of the plurality of flying objects 500 excluding an area in which no gateway 12 exists within a communication range of the flying object 500.

The communication apparatus 400 includes a CMS communication unit 410 and a EMS communication unit 420. The CMS communication unit 410 communicates with the CMS 22. The CMS communication unit 410 may transmit, to the CMS 22, an instruction to move the plurality of flying objects 500 into the arrangement determined by the arrangement determination unit 340. The CMS 22 may control the location of the plurality of flying objects 500 according to the received instruction.

The EMS communication unit 420 communicates with the EMS/OSS 24. In a case where the output intensity of the beam 536 is determined by the arrangement determination unit 340, the EMS communication unit 420 may transmit, to the EMS/OSS 24, an instruction to turn set the output intensity of the beam 536 of each of the plurality of flying objects 500 to the determined output intensity. The EMS/OSS 24 may control the output intensity of the beam 536 of the plurality of flying objects 500 according to the received instruction.

Figure 4:
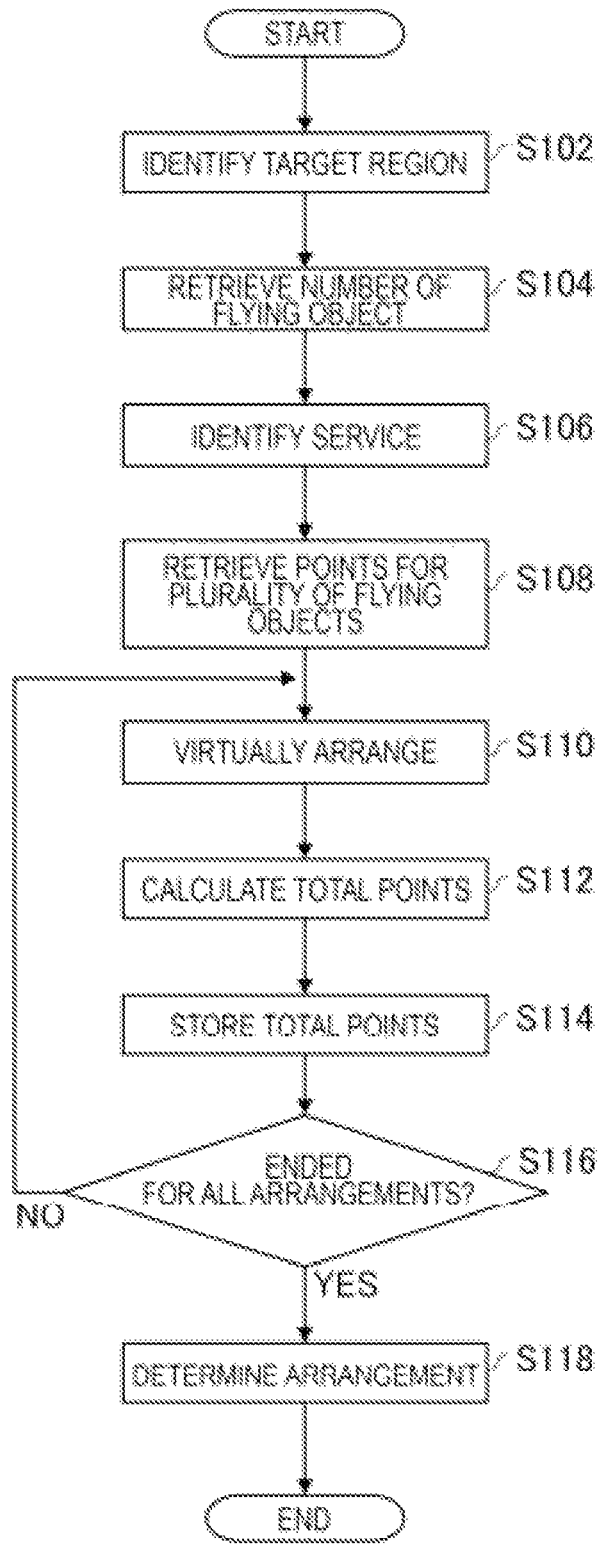
FIG. 4 schematically illustrates one example of a process flow performed by the arrangement determination apparatus 300.

FIG. 4 schematically illustrates one example of a process flow performed by the arrangement determination apparatus 300. Here, a process flow up to determination of the arrangement of a plurality of flying objects 500 will be discussed.

At step (the steps may be abbreviated as S) 102, the target region identifying unit 311 identifies the target region. At S104, the flying object number retrieving unit 312 retrieves the number of flying objects. At S106, the service identifying unit 313 identifies the service.

At S108, the point retrieving unit 320 retrieves a point for each of the plurality of meshes 600 included in the target region identified at S102. At S110, flying objects 500 of the number retrieved at S104 are virtually arranged over the target region. At S112, the arrangement determination unit 340 calculates the total points obtained by adding the points for the meshes 600 included in the wireless communication area 502 of the plurality of flying objects 500 virtually arranged. The arrangement determination unit 340 may calculate the total points obtained by applying the ratio of an area covered by the beam 536 among the area of the mesh 600, which is retrieved by the ratio retrieving unit 330. At S114, the arrangement determination unit 340 stores the total points calculated at S112.

At S116, the arrangement determination unit 340 judges whether the calculation of the total points for all arrangement pattern have ended. In a case where a constraint condition is identified by the constraint condition identifying unit 314, the arrangement determination unit 340 may exclude an arrangement pattern corresponding to the constraint based on the constraint conditions, among the arrangement patterns. In a case where it is judged that the calculation has not ended, the process returns to S110, and a plurality of flying objects 500 is virtually arranged according to the next arrangement pattern.

In a case where it is judged that the calculation has ended, the process proceeds to S118. At S118, the arrangement determination unit 340 determines the arrangement of the plurality of flying objects 500 based on the total points stored for each of the plurality of arrangement patterns. Then the processing is ended.

FIG. 5 illustrates one example of a condition list 710. The service provider designates a condition by selecting, from the condition list 710, for example, a condition corresponding to the service to be provided. In a case where IoT service for connected cars is to be provided, for example, the service provision may designate "IoT" as the service, "road" and "MNO cover" as the area, "latitude", "communication capacity", "no-fly area", and "gateway installation location" as the condition. The arrangement determination apparatus 300 may retrieve the condition designate by the condition list 710.

FIG. 6 illustrates one example of a data list 720 for each mesh 600. Various types of data such as the number of cars, population, or the like for each mesh ID is registered in the data list 720. Points determined based on the various types of data for each mesh is registered in the data list 720. In the data list 720 illustrated in FIG. 6, a higher point may be registered for a mesh 600 including more cars, for example. In addition, a higher point may be registered for a mesh 600 having a larger population. Points generated by the point determining unit 322 may be registered in the data list 720.

Figure 7:
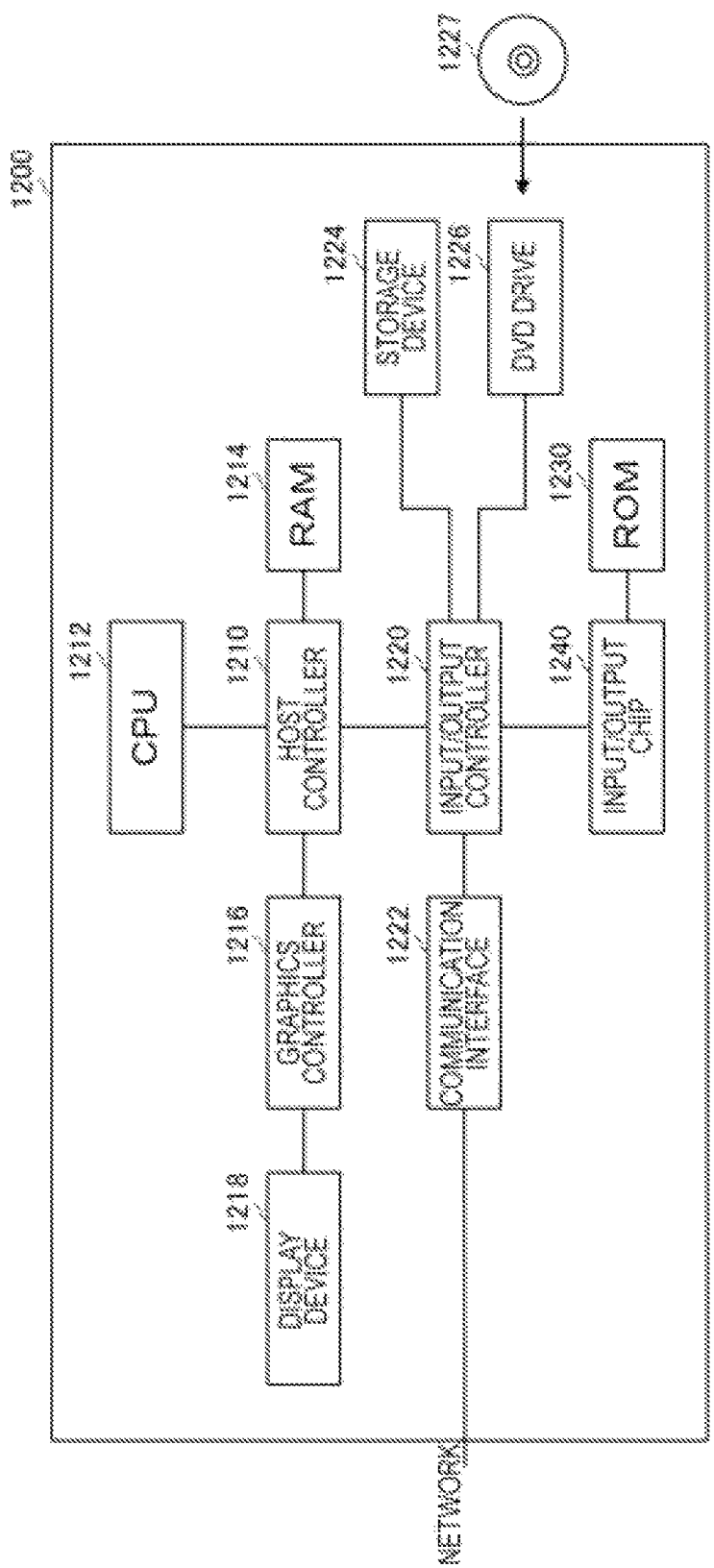
FIG. 7 schematically illustrates one example of a hardware configuration of a computer 1200 which functions as an arrangement determination apparatus 300.

FIG. 7 schematically illustrates one example of a hardware configuration of a computer 1200 which functions as an arrangement determination apparatus 300. A program that is installed in the computer 1200 can cause the computer 1200 to function as one or more "units" in an apparatus of the embodiment of the present invention, or cause the computer 1200 to execute operations associated with the apparatus of the embodiment of the present invention or the one or more "units" thereof, and/or cause the computer 1200 to execute processes of the embodiment of the present invention or steps thereof. Such program may be executed by a CPU 1212 so as to cause the computer 1200 to execute certain operations associated with some or all of the blocks of flowcharts and block diagrams described herein.

The computer 1200 in accordance with the present embodiment includes a CPU 1212, a RAM 1214, and a graphics controller 1216, which are mutually connected by a host controller 1210. The computer 1200 also includes input/output units such as a communication interface 1222, a storage device 1224, a DVD drive 1226 and an IC card drive, which are connected to the host controller 1210 via an input/output controller 1220. The DVD drive 1226 may be a DVD-ROM drive, a DVD-RAM drive, and the like. The storage device 1224 may be a hard disk drive, a solid-state drive, and the like. The computer 1200 also includes legacy input/output units such as a ROM 1230 and a keyboard, which are connected to the input/output controller 1220 via an input/output chip 1240.

The CPU 1212 is configured to operate according to programs stored in the ROM 1230 and the RAM 1214, thereby controlling each unit. The graphics controller 1216 is configured to acquire image data generated by the CPU 1212 on a frame buffer or the like provided in the RAM 1214 or in itself, and to cause the image data to be displayed on a display device 1218.

The communication interface 1222 is configured to communicate with other electronic devices via a network. The storage device 1224 is configured to store programs and data used by the CPU 1212 within the computer 1200. The DVD drive 1226 is configured to read the programs or the data from the DVD-ROM 1227 or the like, and to provide the storage device 1224 with the programs or the data. The IC card drive is configured to read programs and data from an IC card, and/or to write programs and data into the IC card.

The ROM 1230 is configured to store therein a boot program or the like that is executed by the computer 1200 at the time of activation, and/or a program depending on the hardware of the computer 1200. The input/output chip 1240 may also be configured to connect various input/output units to the input/output controller 1220 via a USB port, a parallel port, a serial port, a keyboard port, a mouse port and the like.

A program is provided by a computer-readable storage medium such as a DVD-ROM 1227 or an IC card. The program is read from the computer-readable storage medium, is installed into the storage device 1224, RAM 1214, or ROM 1230, which are also examples of computer-readable storage medium, and is executed by the CPU 1212. The information processing described in these programs is read into the computer 1200, resulting in cooperation between a program and the above-mentioned various types of hardware resources. An apparatus or method may be constituted by realizing the operation or processing of information in accordance with the usage of the computer 1200.

For example, when communication is performed between the computer 1200 and an external device, the CPU 1212 may execute a communication program loaded onto the RAM 1214 to instruct communication processing to the communication interface 1222, based on the processing described in the communication program. The communication interface 1222, under control of the CPU 1212, reads transmission data stored on a transmission buffer region provided in a recording medium such as the RAM 1214, the storage device 1224, the DVD-ROM 1227, or the IC card, and transmits the read transmission data to a network or writes reception data received from a network to a reception buffer region or the like provided on the recording medium.

In addition, the CPU 1212 may be configured to cause all or a necessary portion of a file or a database, which has been stored in an external recording medium such as the storage device 1224, the DVD drive 1226 (DVD-ROM 1227), the IC card and the like, to be read into the RAM 1214, thereby executing various types of processing on the data on the RAM 1214. The CPU 1212 may be configured to then write back the processed data to the external recording medium.

Various types of information, such as various types of programs, data, tables, and databases, may be stored in the recording medium to undergo information processing. The CPU 1212 may also be configured to execute various types of processing on the data read from the RAM 1214, which includes various types of operations, processing of information, condition judging, conditional branching, unconditional branching, search/replacement of information and the like described in the present disclosure and designated by an instruction sequence of programs, and to write the result back to the RAM 1214. The CPU 1212 may also be configured to search for information in a file, a database, etc. in the recording medium. For example, when a plurality of entries, each having an attribute value of a first attribute associated with an attribute value of a second attribute, is stored in the recording medium, the CPU 1212 may search for an entry matching the condition whose attribute value of the first attribute is designated, from the plurality of entries, and read the attribute value of the second attribute stored in the entry, thereby obtaining the attribute value of the second attribute associated with the first attribute satisfying the predetermined condition.

The above-described program or software modules may be stored in the computer-readable storage medium on or near the computer 1200. In addition, a recording medium such as a hard disk or a RAM provided in a server system connected to a dedicated communication network or the Internet can be used as the computer-readable storage medium, thereby providing the programs to the computer 1200 via the network.

In the present embodiment, blocks of the flowcharts and the block diagrams may represent steps of processes in which operations are executed or sections of apparatuses responsible for performing operations. Certain steps and "units" may be implemented by dedicated circuitry, programmable circuitry supplied with computer-readable instructions stored on computer-readable storage media, and/or processors supplied with computer-readable instructions stored on computer-readable storage media. Dedicated circuitry may include digital and/or analog hardware circuits and may include integrated circuits (IC) and/or discrete circuits. Programmable circuitry may include, for example, reconfigurable hardware circuits comprising logical AND, OR, XOR, NAND, NOR, and other logical operations, flip-flops, registers, and memory elements, such as field-programmable gate arrays (FPGA), programmable logic arrays (PLA), etc.

Computer-readable storage medium may include any tangible device that can store instructions for execution by a suitable device, such that the computer-readable storage medium having instructions stored therein comprises an article of manufacture including instructions which can be performed to create means for performing operations specified in the flowcharts or block diagrams. Examples of a computer-readable storage medium may include an electronic storage medium, a magnetic storage medium, an optical storage medium, an electromagnetic storage medium, a semiconductor storage medium, etc. More specific examples of a computer-readable storage medium may include a floppy (registered trademark) disk, a diskette, a hard disk, a random access memory (RAM), a read-only memory (ROM), an erasable programmable read-only memory (EPROM or Flash memory), an electrically erasable programmable read-only memory (EEPROM), a static random access memory (SRAM), a compact disc read-only memory (CD-ROM), a digital versatile disk (DVD), a BLU-RAY(registered trademark) disc, a memory stick, an integrated circuit card, etc.

Computer-readable instructions may include any of assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, JAVA (registered trademark), C++, etc. and conventional procedural programming languages, such as the "C" programming language or similar programming languages.

Computer-readable instructions may be provided to a processor of a general-purpose computer, special purpose computer, or other programmable data processing apparatus, or to programmable circuitry, locally or via a local area network (LAN), wide area network (WAN) such as the Internet, etc. so that the processor of the general-purpose computer, special purpose computer, or other programmable data processing apparatus, or the programmable circuitry performs the computer-readable instructions to create means for performing operations specified in the flowcharts or block diagrams. Examples of processors include computer processors, processing units, microprocessors, digital signal processors, controllers, microcontrollers, etc.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or figures can be performed in any order as long as the order is not indicated by "prior to," "before," or the like and as long as the output from a previous process is not used in a later process. Even if the process flow is described using phrases such as "first" or "next" in the claims, embodiments, or figures, it does not necessarily mean that the process must be performed in this order.

EXPLANATION OF REFERENCES

10: network, 12: gateway, 30: user terminal, 80: communication satellite, 100: arrangement designing system, 200: database, 210: IoTPFDB, 220: OtherDB, 230: SIM result DB, 300: arrangement determination apparatus, 310: condition setting unit, 311: target region identifying unit, 312: flying object number retrieving unit, 313: service identifying unit, 314: constraint condition identifying unit, 320: point retrieving unit, 322: point determining unit, 330: ratio retrieving unit, 340: arrangement determination unit, 400: communication apparatus, 410: CMS communication unit, 420: EMS communication unit, 500: flying object, 502: wireless communication area, 510 main wing portion, 512: propeller, 514: skid, 516: solar panel, 518: flap, 520: body portion, 600: mesh, 710: condition list, 720: data list, 1200: computer, 1210: host controller, 1212: CPU, 1214: RAM, 1216: graphics controller, 1218: display device, 1220: input/output controller, 1222: communication interface, 1224: storage device, 1226: DVD drive, 1227: DVD-ROM, 1230: ROM, 1240: input/output chip

What is claimed is:

1. An arrangement determination apparatus comprising:
    a target region identifying unit configured to identify a target region for providing service by a plurality of flying objects serving as a stratospheric platform, the plurality of flying objects forming a wireless communication area on a ground by emitting a beam toward the ground while flying through the stratosphere;
    a flying object number retrieving unit configured to retrieve a number of the plurality of flying objects;
    a point retrieving unit configured to retrieve a point for each of a plurality of meshes obtained by dividing the target region; and
    an arrangement determination unit configured to determine an arrangement of the plurality of flying objects over the target region based on the number of flying objects and the point for each of the plurality of meshes.

2. The arrangement determination apparatus according to claim 1, comprising a point determining unit configured to determine a point for each of the plurality of meshes.

3. The arrangement determination apparatus according to claim 2, wherein
    the point determining unit is configured to determine a point for each of the plurality of meshes by service types provided by the plurality of flying objects, and
    the point retrieving unit is configured to retrieve a point for each of the plurality of meshes corresponding to a service type provided by the plurality of flying objects.

4. The arrangement determination apparatus according to claim 3, wherein
    in a case where the service type is a service for providing an automobile with wireless communication, the point determining unit is configured to determine a point for each of the plurality of meshes based on at least any of a number of roads, traffic amount on a road, a number of IoT devices which communicate with an automobile, and an average amount of communication by an automobile in each of the plurality of the meshes.

5. The arrangement determination apparatus according to claim 2, wherein
    the point determining unit is configured to determine a point for each of the plurality of meshes based on data including a number of cars and population for each of the plurality of meshes.

6. The arrangement determination apparatus according to claim 5, wherein
    the point determining unit is configured to determine a higher point for a mesh in which the number of cars is higher.

7. The arrangement determination apparatus according to claim 5, wherein
    the point determining unit is configured to determine a higher point for a mesh in which the population is larger.

8. The arrangement determination apparatus according to claim 2, wherein
    the arrangement determination unit is configured to determine an arrangement of the plurality of flying objects such that a total amount of points for the plurality of meshes included in a wireless communication area formed by each of the plurality of flying objects becomes higher.

9. The arrangement determination apparatus according to claim 1, wherein
    the arrangement determination unit is configured to determine an arrangement of the plurality of flying objects such that a total amount of points for the plurality of meshes included in a wireless communication area formed by each of the plurality of flying objects becomes higher.

10. The arrangement determination apparatus according to claim 9, wherein
    the arrangement determination unit is configured to determine an arrangement of the plurality of flying objects such that a total amount of the points for the plurality of meshes included in the wireless communication area formed by each of the plurality of flying objects becomes the highest, by using a genetic algorithm.

11. The arrangement determination apparatus according to claim 10, comprising
a ratio retrieving unit configured to retrieve a ratio of an area covered by the beam identified based on topography data of the target region, among an area of a mesh for each of the plurality of meshes, wherein
the arrangement determination unit is configured to determine an arrangement of the plurality of flying objects such that a total amount obtained by adding the results of multiplying a point for each of the plurality of meshes included in the wireless communication area formed by each of the plurality of flying objects by the ratio for each of the plurality of meshes becomes higher.

12. The arrangement determination apparatus according to claim 9, comprising
a ratio retrieving unit configured to retrieve a ratio of an area covered by the beam identified based on topography data of the target region, among an area of a mesh for each of the plurality of meshes, wherein
the arrangement determination unit is configured to determine an arrangement of the plurality of flying objects such that a total amount obtained by adding the results of multiplying a point for each of the plurality of meshes included in the wireless communication area formed by each of the plurality of flying objects by the ratio for each of the plurality of meshes becomes higher.

13. The arrangement determination apparatus according to claim 1, wherein
each of the plurality of flying objects includes a solar panel, and is configured to perform flight control and wireless communication by using electrical power generated by the solar panel, and
the arrangement determination unit is configured to determine an arrangement of the plurality of flying objects over the target region further based on a latitude of the plurality of meshes.

14. The arrangement determination apparatus according to claim 13, wherein
the arrangement determination unit is configured to exclude from an arrangement of the flying objects an area in which an amount of electric power generated by the solar panel of the flying object is insufficient for providing service.

15. The arrangement determination apparatus according to claim 1, wherein
the arrangement determination unit is configured to determine an arrangement of the plurality of flying objects over the target region further based on area information indicating a no-fly area in which flight of the plurality of flying objects is prohibited.

16. The arrangement determination apparatus according to claim 15, wherein
the arrangement determination unit is configured to determine an arrangement of the plurality of flying objects excluding the no-fly area.

17. The arrangement determination apparatus according to claim 1, wherein
the arrangement determination unit is configured to determine an arrangement of the plurality of flying objects over the target region further based on location information of a gateway on a ground for establishing a feeder link with the plurality of flying objects.

18. The arrangement determination apparatus according to claim 17, wherein
the arrangement determination unit is configured to determine an arrangement of the plurality of flying objects excluding an area in which no gateway exists within a communication range of the flying objects.

19. A non-transitory computer-readable storage medium having stored thereon a program which causes a computer to function as:
a target region identifying unit configured to identify a target region for providing service by a plurality of flying objects serving as a stratospheric platform, the plurality of flying objects forming a wireless communication area on a ground by emitting a beam toward the ground while flying through the stratosphere;
a flying object number retrieving unit configured to retrieve a number of the plurality of flying objects;
a point retrieving unit configured to retrieve a point for each of a plurality of meshes obtained by dividing the target region; and
an arrangement determination unit configured to determine an arrangement of the plurality of flying objects over the target region based on the number of flying objects and the point for each of the plurality of meshes.

20. An arrangement determination method comprising:
identifying a target region for providing service by a plurality of flying objects serving as a stratospheric platform, the plurality of flying objects forming a wireless communication area on a ground by emitting a beam toward the ground while flying through the stratosphere;
retrieving a number of the plurality of flying objects;
retrieving a point for each of a plurality of meshes obtained by dividing the target region; and
determining an arrangement of the plurality of flying objects over the target region based on the number of flying objects and the point for each of the plurality of meshes.

* * * * *